United States Patent [19]

Edwards et al.

[11] Patent Number: 5,314,239

[45] Date of Patent: May 24, 1994

[54] ATV BACKREST

[76] Inventors: Daniel R. Edwards, 4716 Old Lemay Ferry Rd., Imperial, Mo. 63052; Gary G. Johnson, Rte. 1, Box 214 X, Elvins, Mo. 63601

[21] Appl. No.: 61,565

[22] Filed: May 17, 1993

[51] Int. Cl.$^5$ .............................................. A47C 15/00
[52] U.S. Cl. ................................. 297/352; 297/440.24
[58] Field of Search ................ 297/352, 440.1, 440.15, 297/440.24, 230.1, 230.14

[56] References Cited

U.S. PATENT DOCUMENTS

| | | | |
|---|---|---|---|
| 3,895,840 | 7/1975 | Szurszewski | 297/440.15 X |
| 4,032,189 | 6/1977 | Benavente et al. | 297/352 |
| 4,981,325 | 1/1991 | Zacharkow | 297/230.14 |

FOREIGN PATENT DOCUMENTS 0186642  6/1907  Fed. Rep. of Germany ...... 297/352

Primary Examiner—Kenneth J. Dorner
Assistant Examiner—Milton Nelson, Jr.
Attorney, Agent, or Firm—Leon Gilden

[57] ABSTRACT

A backrest structure arranged for mounting to an all terrain vehicle in spaced adjacency to the vehicle's seat is provided. First and second mounting tubes are arranged for mounting to the vehicle to secure a framework mounting a cushion member. The framework is arranged for selective disassembly relative to the first and second mounting tubes for ease of inter-engaging and securing the cushion member relative to the all terrain vehicle seat.

5 Claims, 4 Drawing Sheets

ATV BACKREST

BACKGROUND OF THE INVENTION

1. Field of the Invention

The field of invention relates to an all terrain vehicle structure, and more particularly pertains to a new and improved ATV backrest wherein the same is directed in providing support to an individual in use of an all terrain vehicle.

2. Description of the Prior Art

All terrain vehicles (ATV) are typically employed in the traverse of unpaved and relatively rough driving conditions. Typical bouncing and jostling of an operator of such a vehicle is common place. Providing a backrest for such a vehicle is desirable to minimize injury and assist in comfort, wherein U.S. Pat. Nos. 3,887,231; 4,596,422; and 4,313,639 are typical prior art examples of backrests mounted to motorcycle type vehicles.

The unique construction of an all terrain vehicle and the purpose of such a vehicle is for use in difficult areas requires a backrest structure of enhanced structural integrity and cushion support particularly to the lumbar portions of an operator and in this respect, the present invention substantially fulfills this need.

SUMMARY OF THE INVENTION

In view of the foregoing disadvantages inherent in the known types of backrest apparatus now present in the prior art, the present invention provides an ATV backrest wherein the same is directed for the selective mounting to an all terrain vehicle in adjacency to the vehicle seat. As such, the general purpose of the present invention, which will be described subsequently in greater detail, is to provide a new and improved ATV backrest which has all the advantages of the prior art backrest structure and none of the disadvantages.

To attain this, the present invention provides a backrest structure arranged for mounting to an all terrain vehicle in spaced adjacency to the vehicle's seat. First and second mounting tubes are arranged for mounting to the vehicle to secure a framework mounting a cushion member. The framework is arranged for selective disassembly relative to the first and second mounting tubes for ease of inter-engaging and securing the cushion member relative to the all terrain vehicle seat.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved ATV backrest which has all the advantages of the prior art backrest structure and none of the disadvantages.

It is another object of the present invention to provide a new and improved ATV backrest which may be easily and efficiently manufactured and marketed.

It is a further object of the present invention to provide a new and improved ATV backrest which is of a durable and reliable construction.

An even further object of the present invention is to provide a new and improved ATV backrest which is susceptible of a low cost of manufacture with regard to both materials and labor, and which accordingly is then susceptible of low prices of sale to the consuming public, thereby making such ATV backrests economically available to the buying public.

Still yet another object of the present invention is to provide a new and improved ATV backrest which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
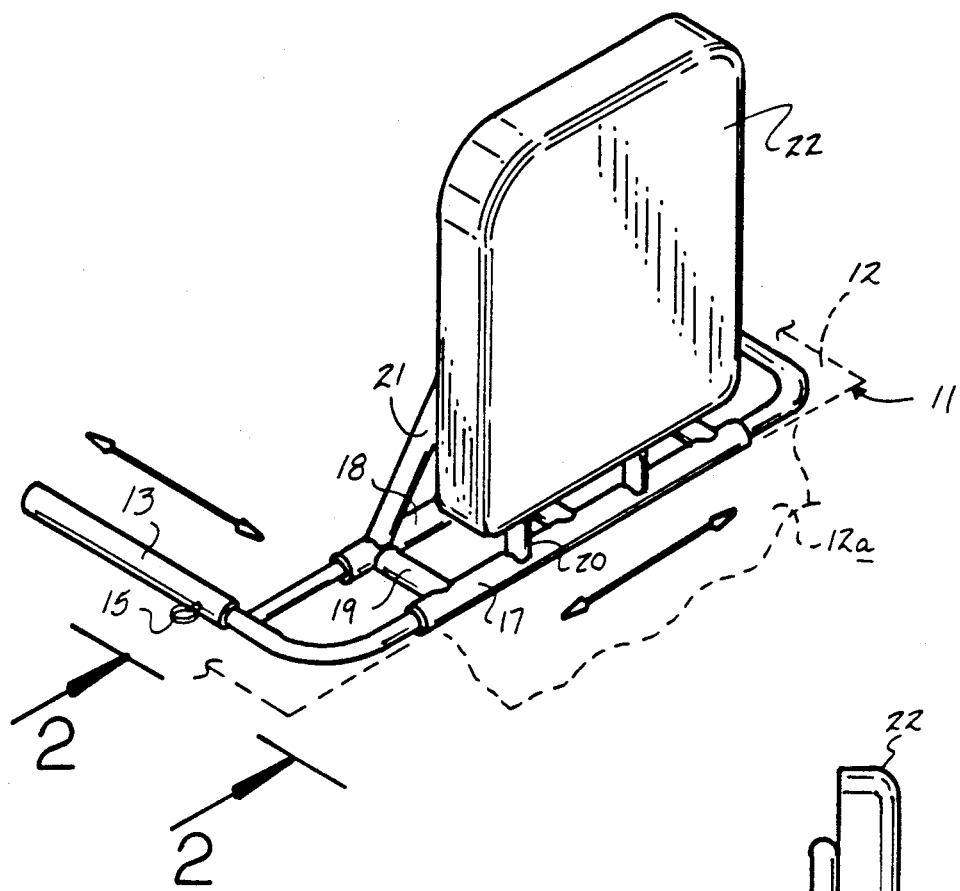
FIG. 1 is an isometric illustration of the invention.
Figure 2:
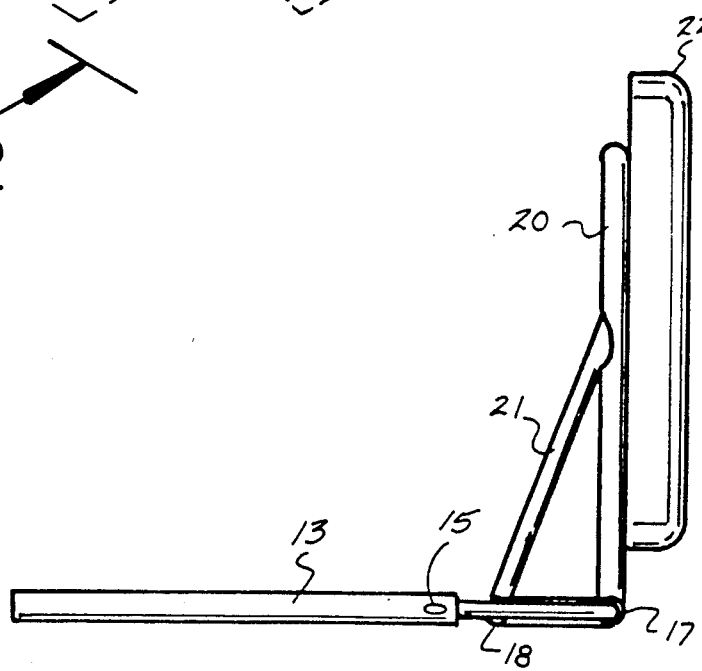
FIG. 2 is an orthographic side view of the invention.

With reference now to the drawings, and in particular to FIGS. 1 to 8 thereof, a new and improved ATV backrest embodying the principles and concepts of the present invention and generally designated by the reference numeral 10 will be described.

Figure 3:
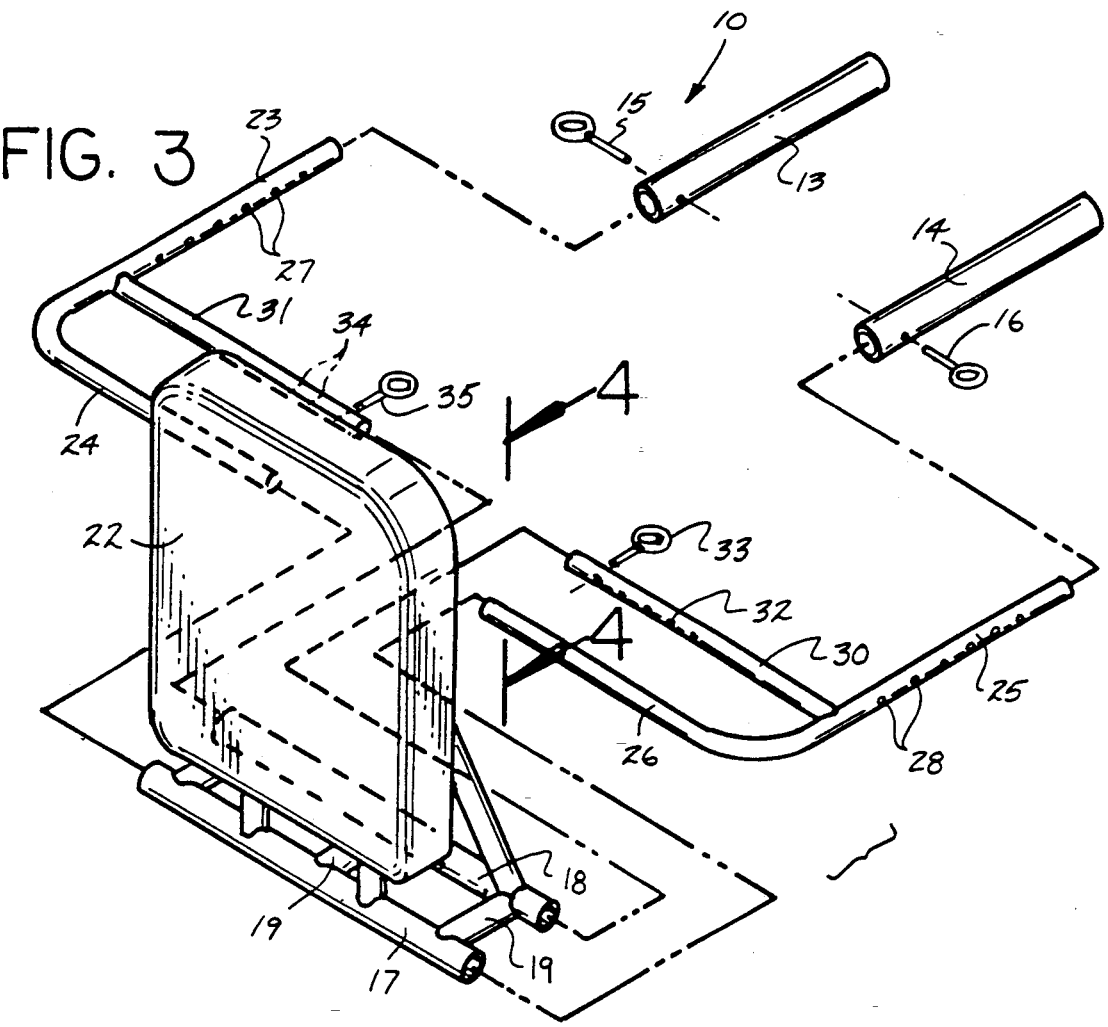
FIG. 3 is an isometric illustration in an exploded view to indicate the various components of the organization.
Figure 4:
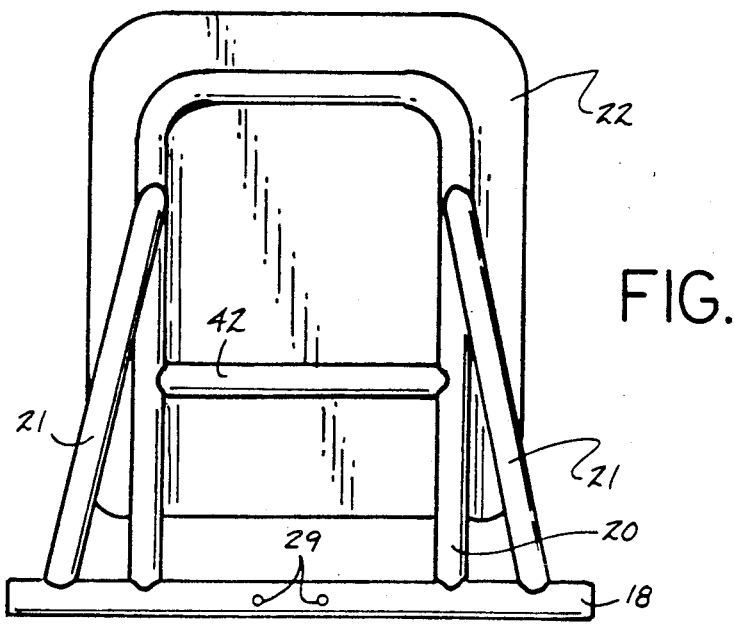
FIG. 4 is an orthographic view, taken along the lines 4—4 of FIG. 3 in the direction indicated by the arrows.

More specifically, the ATV backrest 10 of the instant invention essentially comprises a mounting tube and all terrain vehicle top plate 12 of an all terrain vehicle 11 in adjacency to a seat member 12a (see FIG. 1). Respective first and second mounting tubes 13 and 14 are arranged in a parallel coextensive relationship and are mounted to the top plate 12, each arranged to orthogonally receive respective first and second lock pins 15 and 16 (see FIG. 3 for example). First and second support tubes 17 and 18 arranged in a parallel coextensive relationship and oriented orthogonally relative to the first and second mounting tubes 13 and 14 are arranged such that the first and second support tubes 17 and 18 include a plurality of cross tubes 19 to integrally orient the first and second tubes 17 and 18 in the parallel relationship, in a manner as indicated in FIGS. 1 and 3 for examples. A seat support bracket 20, as indicated of a generally U-shaped configuration, is mounted fixedly at an angle medially of the first support tube 17, with a plurality of brace tubes 21 provided, wherein each of the brace tubes 21 extend fixedly from the support bracket 20 to the second support tube 18. A cross tube 42 is indicated for providing enhanced stability in the mounting of a cushion member 22 to the seat support bracket 20 on an opposed side relative to the brace tubes 21.

First and second L-shaped rods are provided, wherein the first L-shaped rod includes first L-shaped rod first and second legs 23 and 24 oriented orthogonally relative to one another, with the second L-shaped rod having second L-shaped rod first and second legs 25 and 26. The first and second L-shaped rod second legs 24 and 26 are arranged for reception within the first support tube 17. The first and second L-shaped rods first legs 23 and 25 respectively are arranged for sliding reception within the first and second mounting tubes 13 and 14, with first and second apertures 27 and 28 directed through the respective first and second rod first legs 23 and 25 arranged to receive the respective first and second lock pins 15 and 16 of the first and second mounting tubes 13 and 14 respectively to permit securement of the L-shaped rods and the associated cushion member relative to the ATV top plate 12. Second support tube apertures 29 (see FIG. 4) are directed into the second support tube 18, wherein first and second L-shaped rod third legs 30 and 31 are mounted parallel at an equal distance relative to the respective first and second L-shaped rod second legs 24 and 26 spaced an equal distance therefrom relative to an equal spacing indicated by the orientation of the first and second support tubes 17 and 18 relative to one another to permit reception of the respective first and second L-shaped rod third legs 30 and 31 into opposed ends of the second support tube 18. Third and fourth leg apertures 32 and 34 are directed into the respective first and second L-shaped rod third legs 30 and 31, wherein third and fourth leg pins 33 and 35 are arranged for reception through the respective third and fourth leg apertures 32 and 34 into an individual one of the second support tube apertures 29 to secure the L-shaped rods relative to the support tubes 17 and 18. In this manner, disassembly of the organization for storage and transport is availed to one employing the invention.

Figure 5:
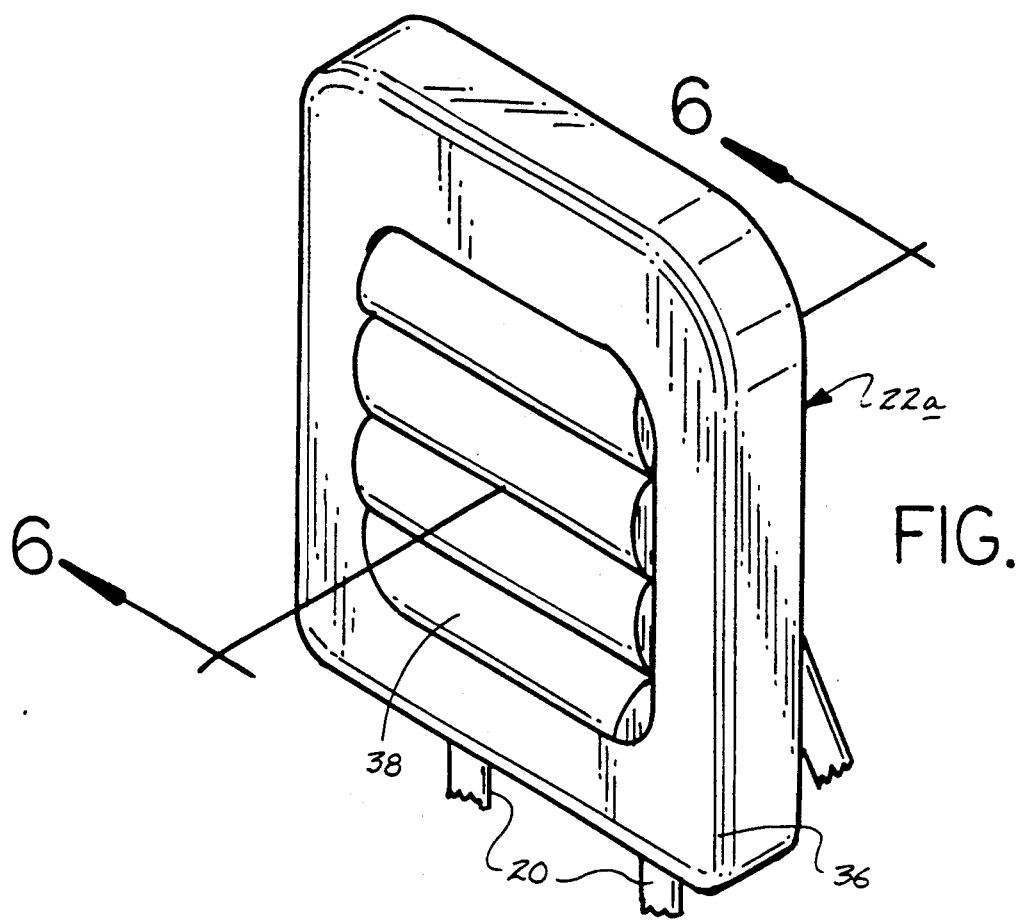
FIG. 5 is an isometric illustration of a modified seat structure.
Figure 6:
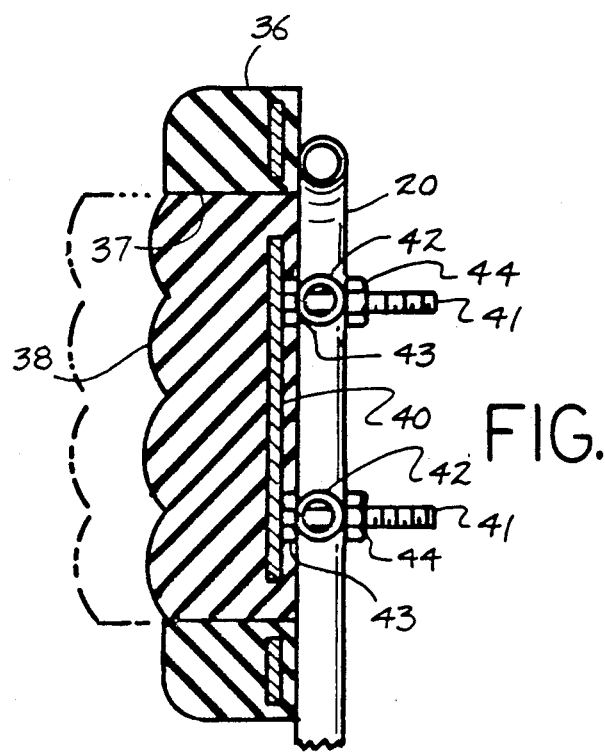
FIG. 6 is an orthographic view, taken along the lines 6—6 of FIG. 5 in the direction indicated by the arrows.

The FIGS. 5 and 6 indicate the use of a modified cushion member 22a in lieu of the cushion member 22. To this end, the seat support bracket 20 includes a plurality of support bracket cross tubes 42 that are parallel relative to one another and to the underlying first support tube 17. The modified cushion member 22a includes a continuous outer perimeter 36 having a central opening 37 (see FIG. 6), wherein a central opening cushion 38 is arranged for reciprocation through the central opening 37. A central cushion mounting plate 40 is secured within the central opening cushion 38, with a plurality of mounting plate adjuster rods 41 orthogonally mounted fixedly to the mounting plate 41, wherein spacer rings 43 are arranged for reception in adjacency to the mounting plate about the individual adjuster rods 41, such that the adjuster rods subsequently are directed each through an individual one of a support bracket cross tube 42 of a plurality of such tubes that are parallel relative to one another. Upon projection of the adjuster rods 41 through the cross tubes 42, fastener members 44 are secured about the adjuster rods 41. In this manner, dependent upon the number and the thickness of the spacer rings 43, the orientation of the opening cushion 38 is arranged for adjusted projection relative to the continuous perimeter 36, as desired, for additional lumbar support.

Figure 7:
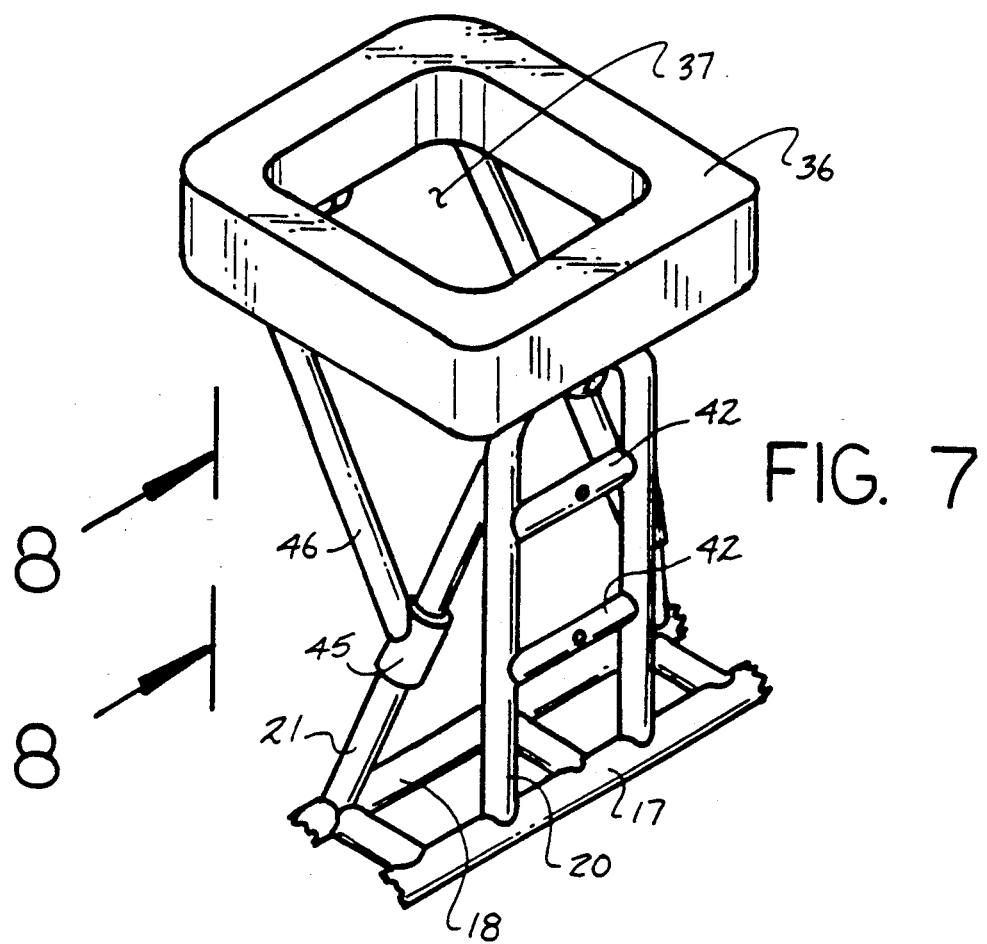
FIG. 7 is an isometric illustration of the modified seat structure arranged for displacement.
Figure 8:
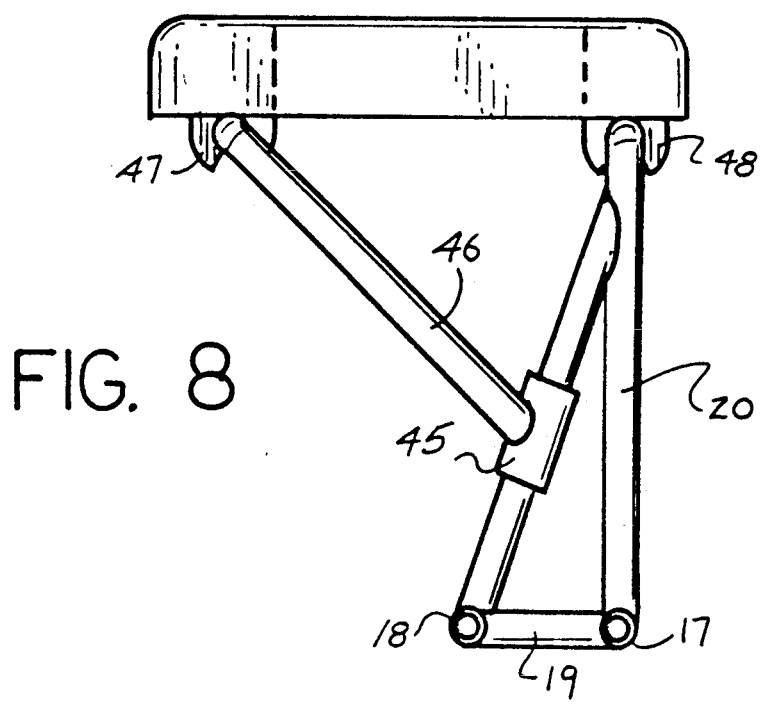
FIG. 8 is an orthographic view, taken along the lines 8—8 of FIG. 7 in the direction indicated by the arrows.

The FIGS. 7 and 8 indicates the displacement of the cushion member 22a to a stored orientation relative to the bracket assembly such that a slide tube 45 is mounted slidably about each of the brace tubes 21 such that each slide tube 45 is secured to a free end of a generally U-shaped slide tube support rod 46, wherein the slide tube support rod 46 is arranged for reception within a resilient C-shaped first clamp 47 at a first end of the continuous perimeter 36, wherein a second end of the perimeter 36 includes a resilient C-shaped second clamp 48 arranged for mounting upon the seat support bracket 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An ATV backrest, comprising, a first mounting tube spaced from, parallel to, and coextensive with a second mounting tube, and a first L-shaped rod spaced from and in a mirror image relationship relative to a second L-shaped rod, wherein the first L-shaped rod includes a first L-shaped rod first leg orthogonally oriented relative to a first L-shaped rod second leg, with the second L-shaped rod having a second L-shaped rod first leg orthogonally oriented relative to a second L-shaped rod second leg, and cushion support means arranged for reception of the first L-shaped rod and the second L-shaped rod, wherein the cushion support means includes a cushion member mounted thereon, and the first L-shaped rod first leg is arranged for reception within the first mounting tube, the second L-shaped rod first leg is arranged for reception within the second mounting tube, with a first lock pin directed through the first mounting tube and the first L-shaped rod first leg, and a second lock pin directed through the second mounting tube and the second L-shaped rod first leg.

2. A backrest as set forth in claim 1 wherein the cushion support means includes a first support tube arranged in a parallel spaced relationship relative to a second support tube, with at least one cross tube arranged fixedly between the first support tube and the second support tube, the first support tube including a seat support bracket fixedly mounted medially thereof, with the seat support bracket angularly oriented and spaced relative to the second support tube, and the seat support bracket arranged for securement of the cushion member thereon, with the first L-shaped rod second leg received within the first support tube and the second L-shaped rod second leg received within the first support tube and the first L-shaped rod further including a first L-shaped rod third leg arranged in a parallel coextensive relationship relative to the first L-shaped rod second leg, the first L-shaped rod third leg fixedly mounted to the first L-shaped rod first leg, with the first L-shaped rod third leg arranged for reception with the second support tube, and the second L-shaped rod including a second L-shaped rod third leg arranged in a parallel relationship relative to the second L-shaped rod second leg, and the second L-shaped rod third leg fixedly mounted to the second L-shaped rod first leg, with the second L-shaped rod third leg arranged for reception within the second support tube.

3. A backrest as set forth in claim 2 including a third lock pin arranged for projection through the first L-shaped rod third leg and the second support tube, and a fourth lock pin arranged for reception through the second L-shaped rod third leg and the second support tube.

4. A backrest as set forth in claim 3 wherein the cushion member includes an outer continuous perimeter having a central opening, and a central opening cushion arranged for sliding reception within the central opening, wherein the central opening cushion has a mounting plate, the mounting plate including at least one adjuster rod fixedly mounted thereto, with the seat support bracket having a cross tube, with at least one adjuster rod received through the cross tube, with a spacer ring arranged for positioning upon a first side of the cross tube and a fastener member positioned on a second side of the cross tube about the adjuster rod.

5. A backrest as set forth in claim 4 wherein the cushion member further includes a first resilient C-shaped clamp at a first end thereof, and a second resilient C-shaped clamp at a second end thereof, wherein the seat support bracket includes a plurality of brace tubes extending from the seat support bracket to the second support tube, with each brace tube including a slide tube, and each slide tube arranged for mounting to a U-shaped slide tube support rod, wherein the slide tube support rod is arranged for securement to the first resilient C-shaped clamp, and the second resilient C-shaped clamp is arranged for securement to the seat support bracket.

* * * * *